United States Patent [19]

Mollstätter

[11] 4,353,721
[45] Oct. 12, 1982

[54] EXHAUST SYSTEM FOR REMOVING AIRBORNE PARTICLES FROM THE VICINITY OF TEXTILE MACHINERY

[75] Inventor: Walter Mollstätter, Pfreimd, Fed. Rep. of Germany

[73] Assignee: Zinser Textilmaschinen GmbH, Ebersbach, Fed. Rep. of Germany

[21] Appl. No.: 261,631

[22] Filed: May 7, 1981

[30] Foreign Application Priority Data

May 9, 1980 [DE] Fed. Rep. of Germany ....... 3017838

[51] Int. Cl.³ .............................................. B01D 46/04
[52] U.S. Cl. ........................................ 55/283; 55/273; 55/287; 55/302; 55/314; 55/431
[58] Field of Search ................. 55/272, 273, 283, 286, 55/287, 301, 302, 312, 314, 431; 210/411, 412; 137/115, 628

[56] References Cited

U.S. PATENT DOCUMENTS

| | | | |
|---|---|---|---|
| 3,887,341 | 6/1975 | Sutter | 55/272 |
| 3,898,065 | 8/1975 | Coffman | 55/301 |
| 3,951,162 | 4/1976 | Wilke | 137/115 |
| 3,951,623 | 4/1976 | Furstenberg | 55/283 |
| 3,993,100 | 11/1976 | Pollard et al. | 137/628 |
| 4,293,320 | 10/1981 | Robinson | 55/273 |

FOREIGN PATENT DOCUMENTS

| | | | |
|---|---|---|---|
| 52-84545 | 7/1977 | Japan | 55/272 |
| 54-153384 | 12/1979 | Japan | 55/283 |

*Primary Examiner*—David L. Lacey
*Attorney, Agent, or Firm*—Karl F. Ross

[57] ABSTRACT

Fibers and lint floating around a spinning machine are aspirated into a system comprising a plurality of filter boxes, each filter box being divided by a screen into a lower raw-air compartment and an upper clean-air compartment, the latter containing a blower serving to circulate incoming air from the screen to a normally open discharge duct. The raw-air compartment has a permanently open intake duct for the aspirated air and is further provided with a normally closed suction duct communicating with a central exhauster common to a group of such filter boxes. From time to time, or when a sensor detects an excessive pressure in the raw-air compartment due to accumulation of solids on the entrance side of the filter screen, the suction duct is opened and the discharge duct is closed whereby the solids are enabled to drop off the screen for removal by the exhauster to a central receptacle.

4 Claims, 3 Drawing Figures

EXHAUST SYSTEM FOR REMOVING AIRBORNE PARTICLES FROM THE VICINITY OF TEXTILE MACHINERY

FIELD OF THE INVENTION

My present invention relates to an exhaust system for the removal of airborne particles such as lint and fibers from the vicinity of spinning machines or other equipment designed to handle filamentary material, especially in a textile plant.

BACKGROUND OF THE INVENTION

Spinning machines or the like are generally provided with hoods for the aspiration of such floating matter. The particle-laden air is drawn by a blower into a raw-air compartment of a filter box separated by a screen from a clean-air compartment which has an outlet for the discharge of the filtered air. This air flow results in the progressive accumulation of solids on the entrance side of the screen, i.e. on its surface confronting the raw-air compartment, which impedes the filtering operation; thus, the screen will have to be cleaned from time to time. Conventional filter boxed do not provide ready access to the screen for that purpose.

OBJECT OF THE INVENTION

The object of my present invention, therefore, is to provide a system of the type referred to in which such cleaning can be conveniently performed, preferably by automatic means.

SUMMARY OF THE INVENTION

In accordance with my present invention, a filter box forming part of such a system has a lower compartment provided with an intake duct for unfiltered air and an upper compartment provided with a discharge duct for filtered air, the two compartments being separated by a screen through which air is aspirated by downstream blower means as known per se. The lower compartment is further provided, at a location remote from the intake duct, with a suction duct connectd to exhaust means separate from the aforementioned blower means and preferably common to a group of such filter boxes located in different parts of the plant. The discharge duct is normally open but can be closed by first shutter means whereas the suction duct is normally closed by second shutter means. With the aid of operating means coupled with the first and second shutter means, the suction duct can be opened substantially simultaneously with closure of the discharge duct whereby particles accumulated on the raw-air side of the screen can be extracted by the exhaust means and delivered to a repository such as a central fiber bin.

In order not to interrupt the operation of the air aspirator associaed with any machine, I provide the shutter-controlling operating means with delay means for retarding the closure of the discharge duct with reference to the opening of the suction duct and for retarding the reclosure of the latter with reference to the reopening of the former.

Pursuant to a more particular feature of my invention, the operating means may comprise a first fluidic actuator coupled with the first shutter means, a second fluidic actuator coupled with the second shutter means, and valve means responsive to a switchover command for temporarily connecting a source of working fluid to the actuators in a mode causing a shift thereof from a normal into an off-normal position. Such a switchover command may be generated by a pressure sensor communicating with the lower compartment of the filter box for opening the suction duct and closing the discharge duct whenever the air pressure in that compartment rises above a predetermined limit. In a plant containing a number of such filter boxes, on the other hand, the switching command may be cyclically emitted to the respective operating means thereof by timer-operated circuitry.

BRIEF DESCRIPTION OF THE DRAWING

The above and other features of my invention will now be described in detail with reference to the accompanying drawing in which.

SPECIFIC DESCRIPTION

Figure 1:
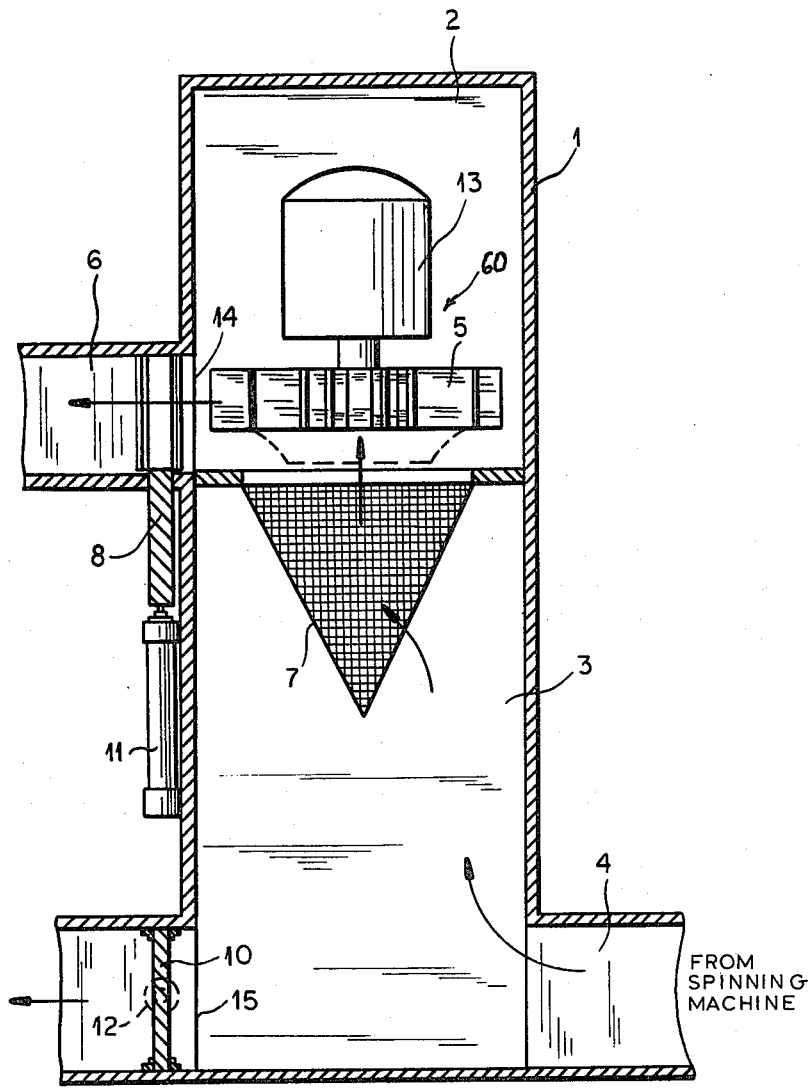
FIG. 1 is a sectional side-elevational view of a filter box with a pair of shutters, forming part of an exhaust system according to my invention.
Figure 2:
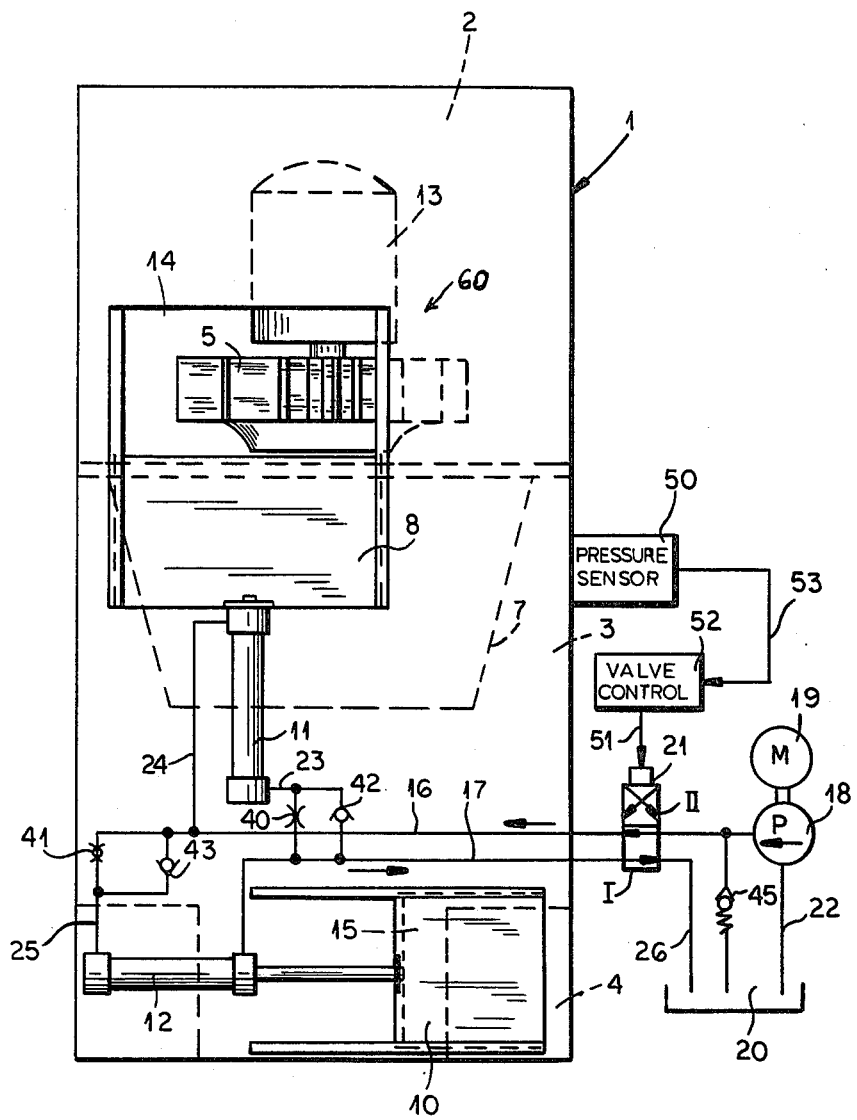
FIG. 2 is a front view of the filter box of FIG. 1 also showing, diagrammatically, a mechanism for operating the shutters.
Figure 3:
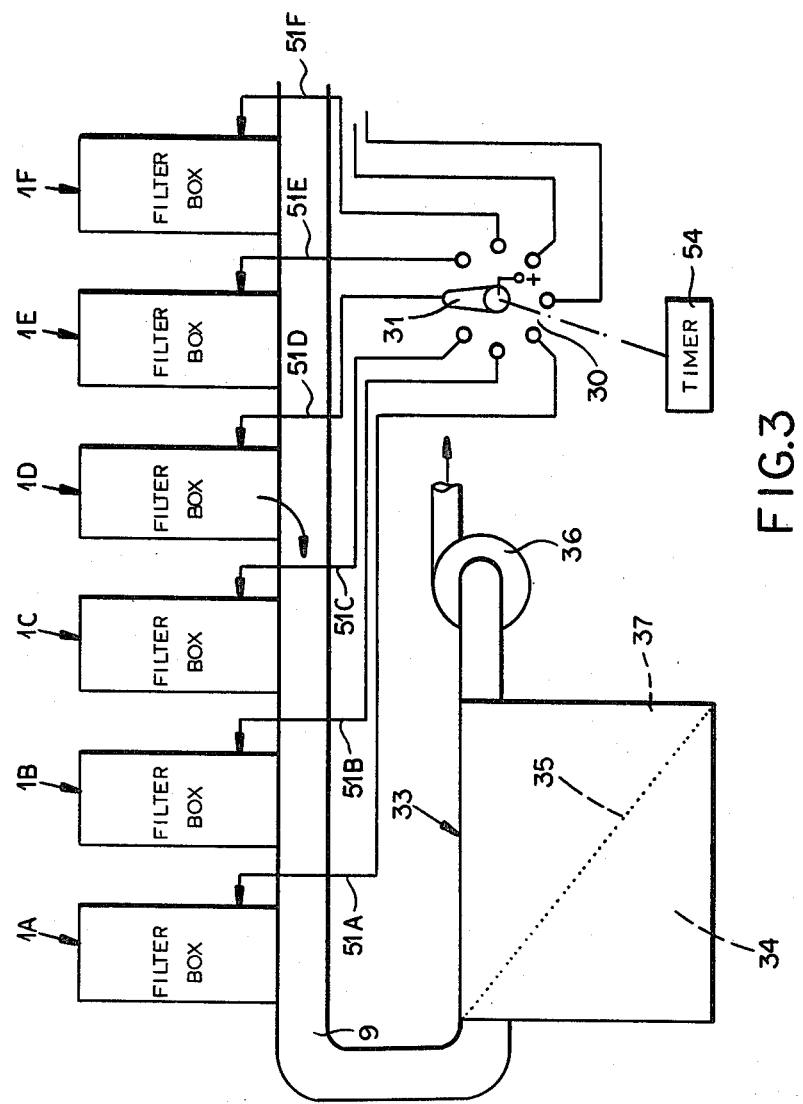
FIG. 3 is a schematic top view of an exhaust system incorporating a plurality of filter boxes of the type shown in FIGS. 1 and 2.

An upright filter box 1, shown in FIGS. 1 and 2, comprises an upper compartment 2 and a lower compartment 3 separated by a screen 7 which is designed to intercept floating particles such as fibers and lint. Compartment 3 has an intake duct 4 extending from a nonillustrated spinning machine and carrying raw air aspirated by a blower 60 in the upper compartment 2, comprising a centrifugal impeller 5 with radial vanes rotated about a vertical axis by a motor 13 which is a part of blower 60. A discharge duct 6 extends from a wall aperture 14 on the level of impeller 5 and returns clean air from compartment 2 to the work station from which the raw air has been aspirated by duct 4. Another wall aperture 15 opposite intake duct 4 leads to a suction duct 9 which, as shown in FIG. 3, is a manifold common to a multiplicity of substantially identical filter boxes 1A–1F. Manifold 9 terminates at a dust separator 33 connected to an intake port of a central exhauster 36 which is common to all the filter boxes and is more powerful than their individual blowers 60. Dust separator 33 contains another filter screen 35 inserted between a fiber bin 34 and a suction chamber 37 connected with exhauster 36.

Aperture 14 is normally open but can be closed by a sliding shutter 8 with the aid of a hydraulic jack 11. A similar jack 12 actuates a sliding shutter 10 normally closing the aperture 15. As seen in FIG. 2, each of these jacks comprises a double-acting cylinder connected across two hydraulic lines 16 and 17 which form part of a hydraulic circuit including an oil pump 18 driven by a motor 19. The cylinder of jack 11 has one port directly connected by a conduit 24 to line 16 and another port which is connected to line 17 by a conduit 23 with two parallel branches respectively containing a throttle 40 and a check valve 42. Similarly, the cylinder of jack 12 has a port directly connected to line 17 and another port connected to line 16 by a conduit 25 with two parallel branches respectively including a throttle 41 and a check valve 43. A solenoid valve 21, in its illustrated position I, connects the line 16 to the high-pressure side of pump 18 whose low-pressure side draws oil via a conduit 22 from a sump 20; line 17 is drained in that position to the sump 20 via a conduit 26. Pump 18 is shunted by the usual pressure-relief valve 45 enabling a continuous circulation of the oil. In its alternate position II, valve 21 links the high-pressure side of pump 18 with line 18 while draining line 16 via conduit 26.

In the normal position illustrated in FIG. 2 the piston of jack 11 is fully retracted whereby the shutter 8 unblocks the discharge aperture 14 of the clean-air compartment 2; at the same time the piston of jack 12 is extended so that shutter 10 obstructs the suction aperture 15 of raw-air compartment 3. Thus, impeller 5 generates a continuous air flow from intake duct 4 via compartment 3, screen 7 and compartment 2 into discharge duct 6.

When the valve 21 is moved into its alternate position II at the start of a regenerating phase, the pressure reversal in lines 16 and 17 creates an instantaneous oil flow from line 17 into the right-hand port of jack 12 and from its left-hand port via check valve 43 into line 16 whereby shutter 10 is opened and unblocks the aperture 15 leading to suction duct 9. Owing to the presence of throttle 40, the pressure in line 17 becomes effective in jack 11 only after the piston of jack 12 has come to rest in its off-normal position; shutter 8 then begins to close the aperture 14 and thus cuts off the flow of clean air into discharge duct 6. The resulting disappearance of the pressure differential across filter screen 7 facilitates the dislodgement of lint and fibers previously accumulated on the underside of screen 7 and allows these particles to be exhausted by way of duct 9 to the central receptacle 34 shown in FIG. 3. At the end of the regenerating phase, valve 21 is restored to its normal position I whereupon the oil pressure in line 16 causes an instant retraction of shutter 8 by the piston of jack 11 as the oil in the cylinder of that jack escapes from its lower port by way of check valve 42 into line 17; when the piston of jack 11 has returned to its normal withdrawn position, this oil pressure is communicated by way of throttle 41 to the left-hand port of jack 12 whereby shutter 10 recloses the aperture 15. In this way, the air flow into box 1 is never cut off so that floating particles are always aspirated either by the blower 60, individual to that box or by the common exhauster 36.

Reversing valve 21 responds to a switchover signal emitted on an output lead 51 of a controller 52 which in FIG. 2 is shown connected by a lead 53 to a pressure sensor 50 communicating with raw-air compartment 3. Whenever the air pressure in that compartment exceeds a predetermined limit, sensor 50 activates the controller 52 for initiating a regenerating phase as described above.

In FIG. 3, on the other hand, I have shown a timer 54 for the periodic stepping of a rotary switch 31 designed to transmit switchover commands in cyclic succession to the reversing valves of filter boxes 1A–1F via respective leads 51A–51F. Cleaning or replacement of the filter screen 35 in the central dust separator 33 can be undertaken at convenient times when none of the filter boxes 1A–1F is in its regenerating phase. These regenerating phases may be of fixed duration, especially with the timer-operated switch shown in FIG. 3, but could also be individually controlled by corresponding pressure sensors 50 (FIG. 2) terminating the switchover command whenever the pressure in compartment 3 falls below a second, lower threshold.

I claim:

1. In a system for removing airborne particles from the vicinity of textile machinery, with a plurality of filter boxes each divided by a screen into a first compartment and a second compartment, each filter box being provided with an intake duct for unfiltered air permanently opening into said first compartment, a normally open discharge duct for filtered air extending from said second compartment, blower means adjacent said screen operable to generate an air flow from said first compartment through said screen and said second compartment into said discharge duct, a suction duct communicating with said first compartment at a location remote from said intake duct, first shutter means positioned and arranged to block said discharge duct, second shutter means positioned and arranged to normally block said suction duct, and operating means coupled with said first and second shutter means for intermittently unblocking said suction duct while blocking said discharge duct during a regenerating phase to enable the extraction of particles accumulating on a surface of said screen facing said first compartment, the suction ducts of all said filter boxes opening into a common manifold provided with exhaust means for drawing accumulated particles from said first compartment of any filter box whose suction duct has been unblocked, the improvement wherein said operating means comprises a first actuator coupled with said first shutter means, a second actuator coupled with said second shutter means, and control means coupled with said actuators for displacing said first and second shutter means at different instants so as to initiate said regenerating phase by moving said first shutter means into a blocking position after moving said second shutter means into an unblocking position and to terminate said regenerating phase by moving said second shutter means into a blocking position after moving said first shutter means into an unblocking position whereby air is continuously aspirated through said intake duct into said first compartment.

2. A system as defined in claim 1 wherein said first and second actuators are a first and a second fluidic jack, respectively, said operating means further comprising a source of working fluid and valve means responsive to switchover commands from said control means for admitting high-pressure fluid from said source to said jacks at relatively staggered times during initiation and during termination of said regenerating phase.

3. A system as defined in claim 2 wherein each of said jacks has a double-acting cylinder with a pair of ports at opposite ends thereof, the cylinder of said first jack having one port thereof connected directly to a first fluid line and having the other port thereof connected through a first throttle shunted by a first check valve to a second fluid line, the cylinder of said second jack having one port thereof connected directly to said second fluid line and having the other port thereof connected through a second throttle shunted by a second check valve to said first fluid line, said source having a high-pressure side and a low-pressure side alternately connectable by said valve means to said first and said second fluid line, said second check valve enabling immediate unblocking of said suction duct by said second jack upon pressurization of said second fluid line with blocking of said discharge duct by said first jack delayed by said first throttle, said first check valve enabling immediate unblocking of said discharge duct by said first jack upon pressurization of said first fluid line with reblocking of said suction duct by said second jack delayed by said second throttle.

4. A system as defined in claim 1, 2, or 3 wherein said second compartment lies above said first compartment, said blower means being disposed in said first compartment.

* * * * *